(12) United States Patent
Smith

(10) Patent No.: US 6,715,781 B1
(45) Date of Patent: Apr. 6, 2004

(54) INTERCHANGEABLE BALL HITCH ASSEMBLY

(76) Inventor: Jerry R. Smith, 5690 W. Rowland Ave., Littleton, CO (US) 80128

( * ) Notice: Subject to any disclaimer, the term of this patent is extended or adjusted under 35 U.S.C. 154(b) by 0 days.

(21) Appl. No.: 10/286,005

(22) Filed: Oct. 31, 2002

(51) Int. Cl.[7] .............................. B60D 1/06; B60D 1/07
(52) U.S. Cl. ..................................... 280/416.1; 280/511
(58) Field of Search ........................... 280/415.1, 416.1, 280/511, 512, 513

(56) References Cited

U.S. PATENT DOCUMENTS

| | | | |
|---|---|---|---|
| 4,060,331 A | 11/1977 | Domer et al. | |
| 4,230,336 A | * 10/1980 | Avrea et al. | ................. 280/511 |
| 4,433,854 A | 2/1984 | Smith | |
| 4,596,406 A | * 6/1986 | Van Vleet et al. | .......... 280/511 |
| 4,938,496 A | 7/1990 | Thomas et al. | |
| 5,116,072 A | 5/1992 | Swenson | |
| 5,169,168 A | 12/1992 | Harry et al. | |
| 5,290,057 A | * 3/1994 | Pellerito | ...................... 280/507 |
| 5,419,576 A | 5/1995 | Van Vleet | |
| 5,511,814 A | * 4/1996 | Floyd | .......................... 280/507 |
| 5,860,669 A | 1/1999 | Wass et al. | |
| 5,871,222 A | 2/1999 | Webb | |
| 6,206,400 B1 | * 3/2001 | Stech | ....................... 280/416.1 |
| 2001/0030410 A1 | * 10/2001 | McCoige et al. | ........... 280/511 |

* cited by examiner

*Primary Examiner*—Kevin Hurley
(74) *Attorney, Agent, or Firm*—Timothy J. Martin; Michael R. Henson; Rebecca A. Gegick

(57) ABSTRACT

An interchangeable hitch ball assembly includes a mounting element to be secured to a vehicle and a hitch ball element to be secured to the mounting element. A post is on one of the mounting element and the hitch ball element, and a cavity is formed in the other. The post has a threaded head that screws past a threaded entryway in the cavity so as to reside in an interior chamber. The hitch ball can freely rotate relative to the mounting element when assembled, but it cannot be separated by axial movement. A fastener may be included to further secure the two members together. Several differently sized hitch balls may form a set to adapt to differently sized trailer tongues.

42 Claims, 4 Drawing Sheets

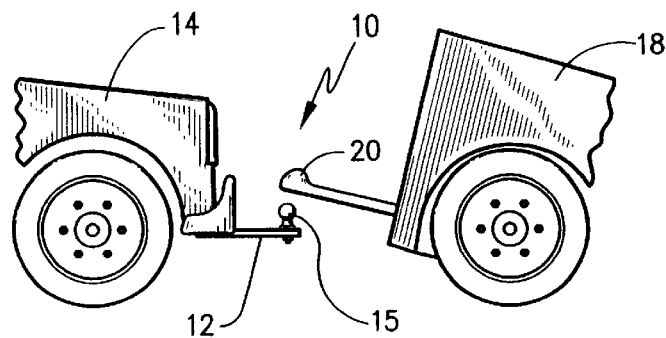
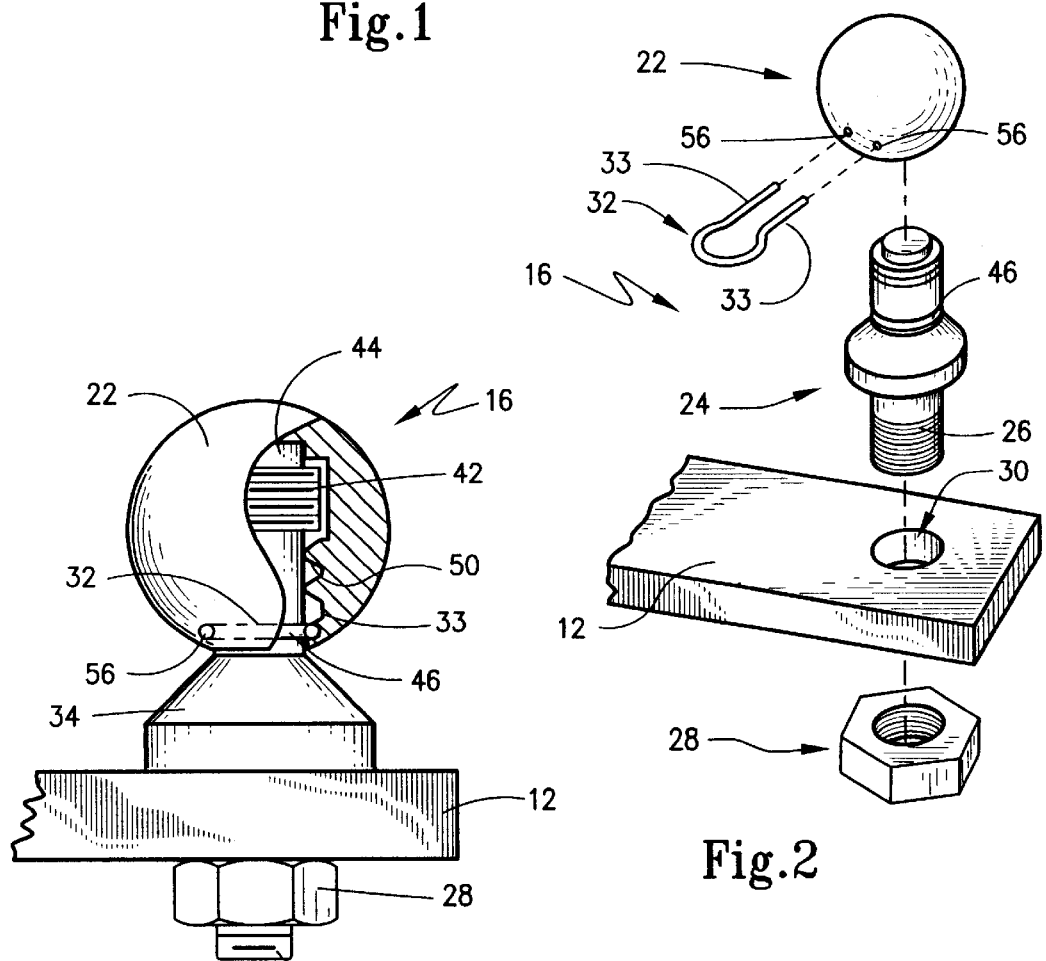

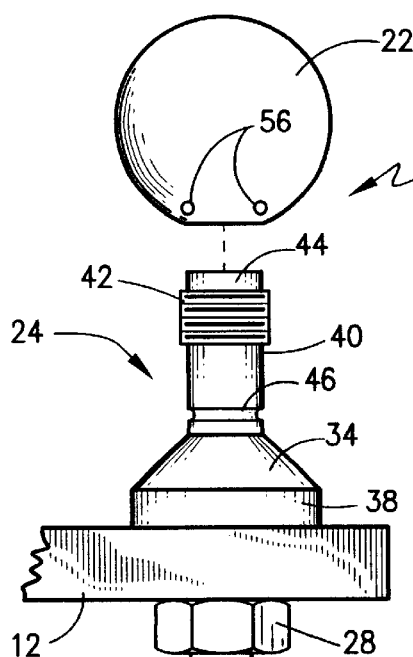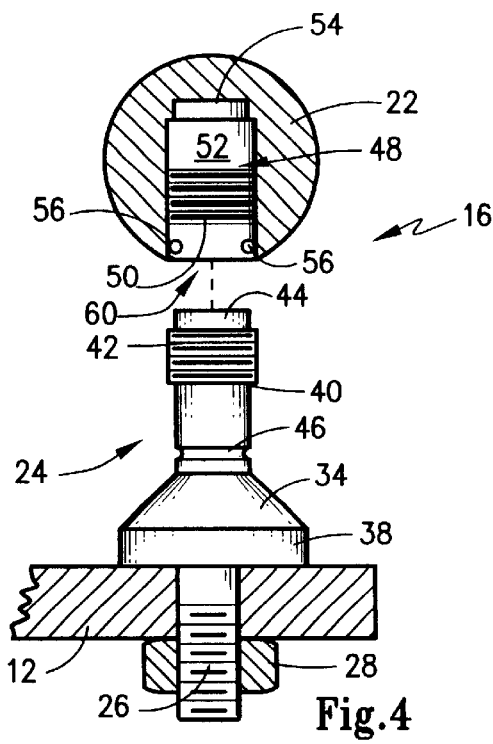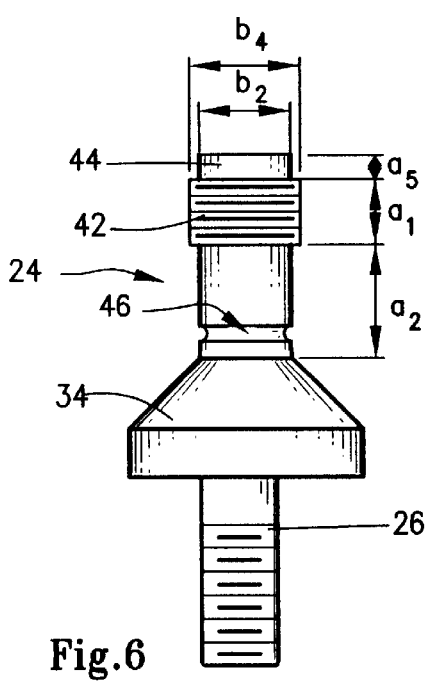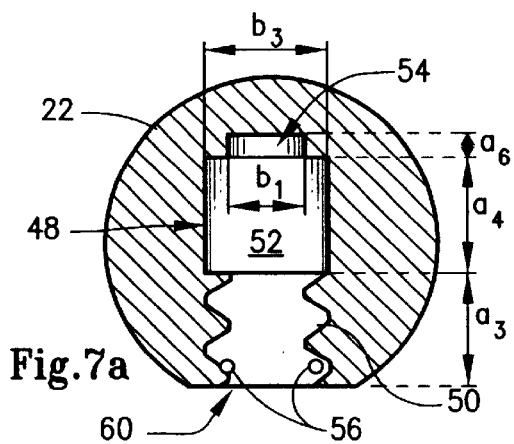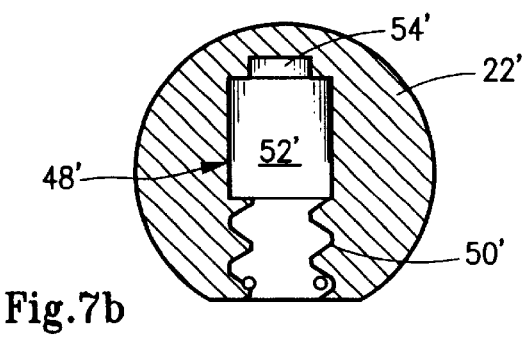

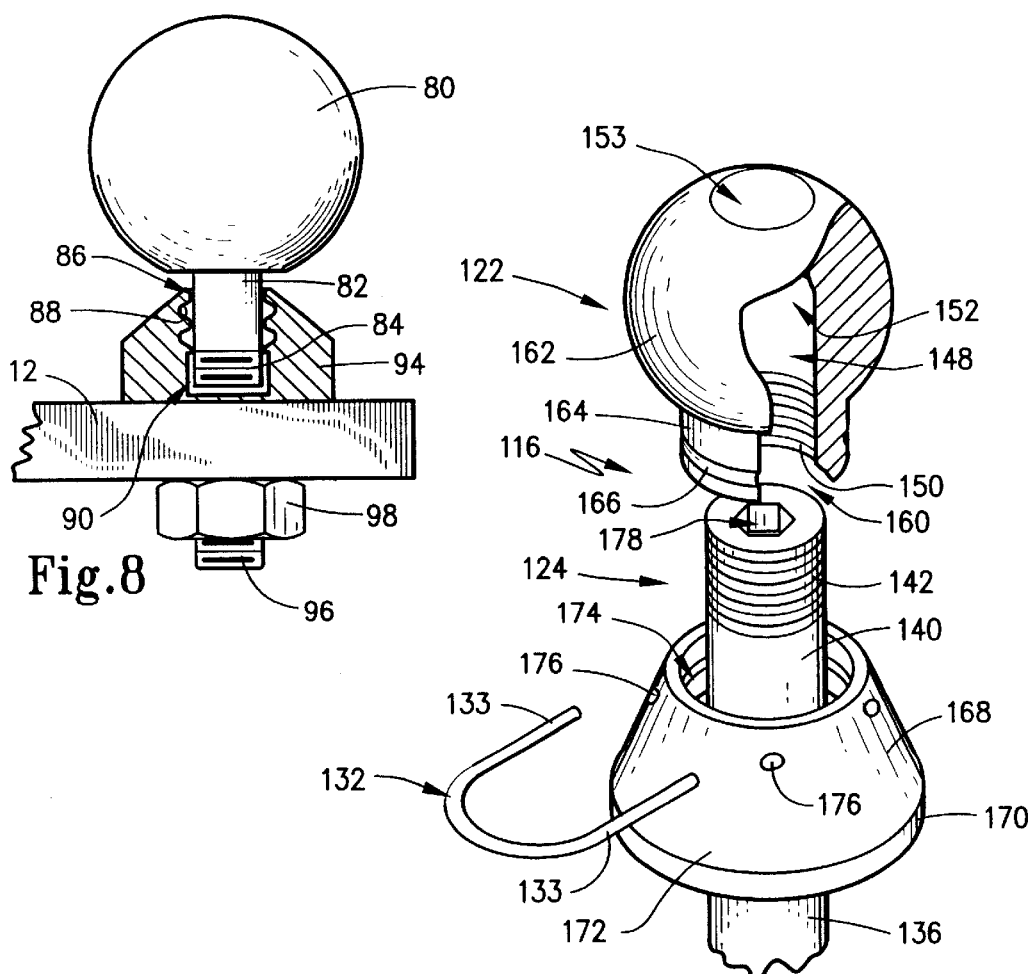
Fig.8
Fig.9
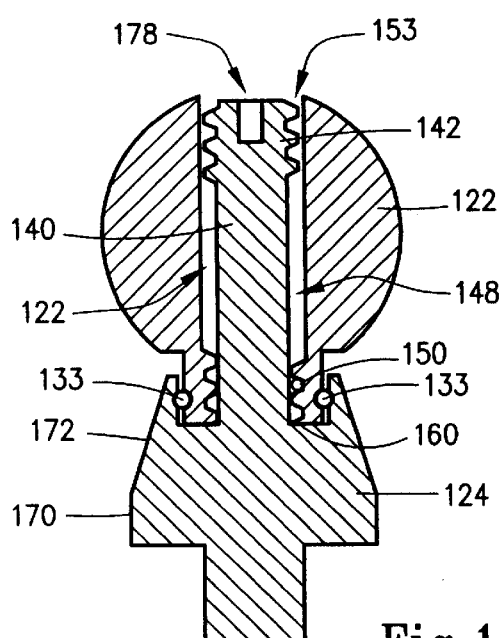
Fig.10

INTERCHANGEABLE BALL HITCH ASSEMBLY

FIELD OF THE INVENTION

The present invention generally relates to trailer hitches of the type commonly used to connect a towing vehicle to a trailer and, more particularly, to a ball hitch assembly having a removable and easily interchangeable ball including structure for preventing the inadvertent disassembly of the hitch.

BACKGROUND OF THE INVENTION

Trailer hitches are devices which connect a tow vehicle to a trailer by means of a ball hitch which is mounted onto the vehicle, or onto a tow bar which is connected to the vehicle. The hitch then mates with a socket located on the trailer tongue. This ball and socket configuration is designed to allow adequate rotation of the socket with respect to the ball so that the vehicle-trailer combination can maneuver around corners. Typically the socket mechanism has a releasably lockable coupling so that it locks onto the ball hitch to prevent decoupling while towing.

There are several standardized sizes of these ball and socket systems, the specific size usually depends on the size of the trailer or its weight and is specified by the outer diameter of the hitch ball. Typical ball sizes are diameters of 1-⅞ inches, 2 inches, 2-¼ inches, and 2-5/16 inches. For a trailer hitch to function properly and safely, it is important that the size of the ball matches that required by the particular hitch socket. Using a ball that is smaller than the size specified for the trailer could have disastrous consequences, and coupling a trailer with a ball that is too large for its socket is impossible. A vehicle may need to tow a variety of trailers, with sockets of different sizes, and hence there is a need to be able to employ different sizes of hitch balls on a vehicle.

Conventional hitch balls consist of a mounting bolt and ball as an integral unit. The unit is bolted onto the tow bar and requires at least one wrench for its removal and installation. This can be inconvenient because it requires that one carry the proper tools in the vehicle, as well as a variety of hitch balls, which can have their threads damaged if not properly stored. Additionally, the hitch ball mounting threads may become corroded or filled with debris so that removing the ball can be a formidable task, especially when trying to change a hitch ball at night in the rain. It is usually not feasible to have multiple, different-sized balls bolted to a vehicle because the ball must be located along the centerline of the vehicle and at a preferred height in order to evenly distribute the loads acting on the vehicle and trailer.

With the purpose of overcoming these problems, several types of hitches, which present other schemes of interchanging balls, have been invented. For example, U.S Pat. No. 4,433,854 issued Feb. 28, 1984 to Smith shows an interchangeable ball hitch in which the ball contains a spring-biased latch that locks the ball onto a mounting piece which is attached to the tow bar and which can be released for interchanging the ball sizes. The latch includes a spring and pin which are integral to the mounting piece. This device requires that the ball be rotated into the proper position for removal which can be difficult if trying to change a ball at night without a flashlight.

U.S. Pat. No. 5,169,168 issued Dec. 8, 1992 to Harry et al describes a hitch ball assembly including interchangeable balls and a mounting post which is attached to the tow bar. The mounting post contains a grooved path and the ball has a pin on the inner cavity of the ball. To mount the ball one must align the pin with the beginning of the groove at the top of the post and then rotate and depress the ball to move the pin along the groove until it has fully seated. Once seated, the ball is free to rotate around the mounting post. The pin can be damaged during towing by the trailer loads if the tolerances of the fit between the ball and post are too large or if the ball binds up in the hitch socket and then applies those extra loads to the post. In these instances a large portion of the trailer forces are being transferred to the vehicle through just the pin.

U.S Pat. No. 5,419,576 issued May 30, 1995 to Van Vleet, describes an interchangeable ball hitch connector which includes an interchangeable ball and a mounting post which is bolted onto the tow bar. The ball has a chamber which the mounting post fits within. Both the ball and the post have holes which are aligned when the ball is in place and through which a locking pin is placed to hold the two parts together.

U.S. Pat. No. 5,871,222 issued Feb. 16, 1999 to Webb describes a detachable ball hitch apparatus which includes a ball hitch with an integral post that fits into the cavity of a piece that mounts onto the tow bar. The post has a spring-loaded pin that slides into a groove in the tow bar piece. When the ball is fully mounted the pin is depressed to lock it into the groove to prevent its unintentional removal. Once installed, the ball is not free to rotate. If the spring should fail, the ball cannot be easily removed from the tow bar. Also, the pin and spring are located inside of the ball so this device would be more expensive than others because each of the interchangeable balls must contain those pieces.

While the above-described structures teach the use of detachable and/or interchangeable hitch balls for towing applications, there remains a need for improved interchangeable hitch ball assemblies. This need manifests in both the need for simplified structures as well as structures that can be manufactured efficiently at a reduced cost. The present invention is directed to providing an improved construction for interchangeable hitch ball systems.

SUMMARY OF THE INVENTION

It is the object of the present invention to provide for an improved tow hitch which includes an easily interchangeable hitch ball and which mates with standard hitch ball sockets.

It is another object of the present invention to provide a new and useful hitch ball and mounting structure that allows easy interchange of hitch balls of various sizes for different towing applications. A further object of the present invention is to provide an interchangeable hitch ball assembly that is easy to manufacture yet which is durable in use.

Still a further object of the present invention which provides for interchangeable hitch balls that can be release and relocked yet readily removed from a tow bar.

Yet a further object of the present invention is to provide a new and useful method for attaching an interchangeable hitch ball element to a mounting element in a towing application.

According to the present invention, then, an interchangeable hitch ball assembly for towing a trailer is provided. The hitch ball assembly generally includes a mounting element that is adapted to be secured to a vehicle and a hitch ball element that is adapted to be secured to the mounting element to define an assembled state. One of the mounting element and the hitch ball element includes a post while the other of the mounting element and the hitch ball element has a cavity formed therein such that the cavity has a threaded entryway and an interior chamber. The post has a threaded head portion with a selected axial head length. The interior chamber is then formed to have a depth greater than the axial head length of the head portion. The threaded head portion of the post may be threadably engaged by the threaded entryway but, the chamber and the entry way are dimensioned such that, when in the assembled state, the head portion resides in the interior chamber. This allows the hitch ball element and the mounting element to be freely rotatable with respect to one another, yet they are prevented from being disassembled from one another by drawing the hitch ball element axially away from the mounting element.

The mounting element is shown to include a base and means for securing the base to the vehicle, such as by a mounting shank. When the post is supposed on the base and the chamber is formed in the hitch ball element, this mounting shank extends co-axially of the post and oppositely thereof. The mounting shank then receives a fastener, such as a nut, to secure the base to the vehicle, such as the tow bar.

When the cavity is formed in the hitch ball element, this cavity is a bore that extends partway through the hitch ball element. The hitch ball itself may include solid geometric construction selected from a group consisting of spheres, cylinders, prisms, pyramids and cones. Where the hitch ball element is spherical, the chamber extends radially thereof.

An auxiliary interlock structure may be associated with the mounting element in the post and the hitch ball element. The auxiliary locking structure is adapted to selectively and releasibly prevent disassembly of the hitch ball element from the post. In one embodiment, the auxiliary interlock structure is a spring clip that extends through bores formed in the mounting element which engage a groove on the mounting post. In another embodiment, the interlock structure is formed as a rotatable pin that has a cam structure and that is received within a groove on a portion of the hitch ball element. This pin can rotate between an open position wherein a cut-out portion provides clearance so that the hitch ball may be removed from the mounting post yet may be pivoted into a lock state wherein a cammed portion of the pin resides in the groove and therefore prevents disassembly of the hitch ball and mounting element.

In the exemplary embodiment, the axial head length of the threaded head portion of the post is length $a_1$ and the entryway has an axial length $a_3$. The unthreaded interior of the chamber has an axial length $a_4$ and the post includes an unthreaded portion with an axial length $a_2$. In such case, Axial length $a_4$ is greater than axial length $a_1$, and axial length $a_2$ is greater than axial length $a_3$. In addition, the post may include a pilot portion with an axial length $a_5$. Here, the chamber includes a recess of axial length $a_6$ wherein the axial $a_5$ is greater than the axial length $a_6$.

If desired, the hitch ball element may include a collar. In such event, the mounting element includes a recess such that the collar and the recess are dimensioned such that the collar resides in the recess when the hitch ball assembly is in the assembled state.

The present invention is also directed to a method of attaching interchangeable hitch ball element to a mounting element. This method can include any of the mounting steps inherent in the above described structure. Particularly, however, the method of the present invention includes inserting a threaded head portion of a mounting element into a threaded entryway of a cavity provided in the hitch ball and rotating the hitch ball element with respect to the mounting element in a direction to engage the threads at the entryway with the threads provided in mounting element. Further rotation of the hitch ball element with respect to the mounting element moves the threads of the mounting post beyond the entryway threads and into an unthreaded interior chamber. Thereafter, the method includes the step of allowing free rotation of the hitch ball element on the mounting element while the head portion is located within the chamber.

The method of the present invention can further include the steps of advancing the hitch ball element axially away from the mounting element and rotating the hitch ball element with respect to the mounting element in the direction to engage the threads on the head portion of the mounting element with the threads on the entry way of the cavity. Further rotation has been undertaken so that the threads of the head portion are disengaged from the threads of the entryway.

These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 1 is a side view in elevation of the rear of a tow vehicle, the hitch apparatus, and the front portion of a trailer;

FIG. 2 is an exploded, perspective view of the hitch ball assembly and tow bar according to a first exemplary embodiment of the present invention;

FIG. 3 is a side view in elevation of the hitch ball assembly of FIG. 2 shown in a disassembled state;

FIG. 4 is a side view in elevation and in partial cross-section showing the hitch ball assembly of FIG. 3 in the disassembled state;

FIG. 5 is a side view in elevation, with partial section of the hitch ball element, of the hitch ball assembly of FIGS. 3 and 4 showing the assembly in an assembled state;

FIG. 6 is side view in elevation of the mounting element according to the first exemplary embodiment of the present invention;

FIG. 7($a$) is a side view in cross-section of the hitch ball element according to the first exemplary embodiment of the present invention and used with the mounting element of FIG. 6;

FIG. 7($b$) is a side view in cross-section of a hitch ball similar to that shown in FIG. 7($a$) but having a smaller diameter;

FIG. 8 is a side view in partial cross-section showing a second exemplary embodiment of the present invention in an assembled state and wherein the mounting post is located on the hitch ball and the cavity is formed in the mounting element;

FIG. 9 is an exploded perspective of a hitch ball assembly according to a third exemplary embodiment of the present invention and shown in a disassembled state with a partial cutaway of the hitch ball element;

FIG. 10 is a sectional, side view in elevation of the hitch ball assembly of FIG. 9 in an assembled state;

DETAILED DESCRIPTION OF THE EXEMPLARY EMBODIMENTS

Figure 11:
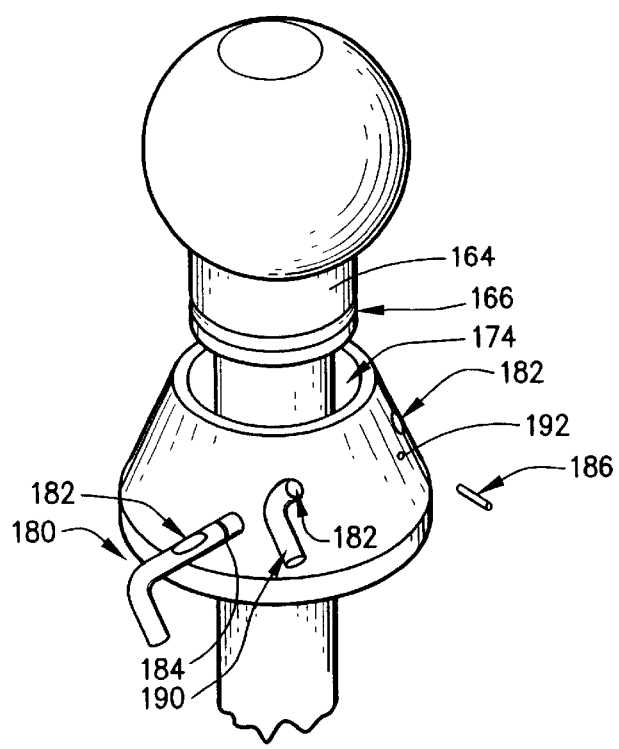
FIG. 11 is an exploded perspective of a hitch ball assembly, in a disassembled state, according to a fourth exemplary embodiment of the present invention that is similar to the embodiment shown in FIGS. 9 and 10 but illustrating an alternative embodiment of the fastener structure.

The present invention is directed to a hitch ball assembly that allows ready interchange of hitch ball elements having different sizes or dimensions so that different towing configurations can be established between a tractor vehicle and a trailer vehicle. The present invention is also directed to a method for providing such interchangeable hitch ball assemblies.

According to the present invention, the hitch ball assembly broadly includes a mounting element that is adapted to be secured to a vehicle and a hitch ball element that is adapted to be secured to the mounting element to define an assembled state. One of the mounting element and the hitch ball element includes a post that has a threaded head portion with a select axial length while the other of the mounting element in the hitch ball has a cavity formed therein. This cavity has a threaded entryway and an interior chamber. The interior chamber has a depth greater than the axial head length of the head portion. It is constructed such that a head portion may be threadably engaged thereby. The chamber and the entryway are dimensioned such that, when in the assembled state, the head portion resides in the interior chamber such that the hitch ball element and the mounting element may be freely rotated with respect to one another yet are prevented from being disassembled by drawing the hitch ball element axially away from the mounting element.

To understand the details of this invention, reference is first made to FIG. 1 which shows the trailer hitch apparatus 10 of a typical vehicle-hitch-trailer combination. The trailer 18 is connected to the tow vehicle 14 by the hitch apparatus 10 which is typically a hitch ball 15, mounted to a tow bar 12, which engages with a socket assembly 20 which has been mounted onto, or is an integral part of, the trailer 18. This ball-and-socket type of connection allows for sufficient freedom of rotation between the ball and socket so that the vehicle and trailer can safely maneuver.

A first exemplary embodiment of the present invention is shown in an exploded view in FIG. 2. Here it may be seen that the hitch ball assembly 16 includes a generally spherical hitch ball element 22 which can be manually mounted onto the mounting element 24 that in turn is secured to the tow bar 12. Once mounted, the hitch ball element 22 is secured from becoming inadvertently dismounted by way of an auxiliary interlock clip 32. Clip 32 has a pair of legs 33 that are inserted through holes 56 in hitch ball 22 and engage groove 46 on mounting element 24.

FIG. 2 shows an example of a hitch ball assembly 16 configured to attach to the vehicle by way of a tow bar 12. To accomplish this, the mounting element 24 possesses a threaded shank 26 which fits within a bolt hole 30 in the tow bar 12 and is affixed to it by a fastener in the form of nut 28. It should be realized that the mounting element 24 can also be attached to a tow bar 12 by other means such as a bolt which screws into a threaded hole in the mounting element 24 or by permanently welding it to the tow bar 12. Also, the mounting element 24 can be configured to attach to the vehicle by way of the bumper or the frame instead of via a tow bar 12. It should be appreciated that the hitch ball element 22 can have a selected outer geometry and size to be compatible with any of the various sizes of hitch ball sockets 20 that are available for trailers 18. By way of illustration and not limitation, FIGS. 12(a)–12(d) show hitch balls having solid geometries shaped, respectively, as a cylinder, a prism, a pyramid and a cone.

In any event, the interchangeability of the hitch ball element 22 is best understood by referring to FIGS. 3 through 7. With reference to FIGS. 3 and 4, the hitch ball assembly 16 is shown with the mounting element 24 attached to a tow bar 12. The hitch ball element 22 is shown in FIG. 4 as a sectional view as is the tow bar 12 and the nut 28; FIG. 3 shows the same pieces but with no sectional views. In these two figures the hitch ball assembly 16 is shown in the disassembled or unmounted state where the hitch ball element 22 is removed from the mounting element 24, and it may be seen that the hitch ball assembly 16 broadly includes the mounting element 24 and the hitch ball element 22.

The mounting element 24 is comprised of a base piece 34, a mounting shank 26, and a post 40. The base piece 34 includes a flat bottomed, cylindrical portion 38 which is tapered upwardly to terminate at its distal end in a cylindrical post 40. Thus, the base is generally frustoconical in shape. The post 40 includes a threaded head portion 42, a groove 46, and terminates in a pilot portion 44. The diameter of the post 40 is smaller than the diameter of the cylindrical portion 38. The axial length of the base piece 34 is sized to provide adequate clearance distance between the tow bar 12 and the hitch ball element 22 for the hitch ball socket 20 to move as required during operation. One skilled in the art can see that the transverse profile of the base piece 34 need not be circular but may be of other shapes and may also contain recesses or appendages to mate with a wrench or other tool for the purpose of tightening or loosening the nut 28.

A mounting shank 26 extends generally perpendicularly from the surface of the mounting element 34 which opposes the post 40 and terminates in a threaded portion for receiving a nut 28. As mentioned previously, the mounting shank 26 and nut 28 combination may be replaced by a threaded recess in the bottom of the base piece 36 which mates with a bolt. The length of the mounting shank 26 and the length of the threaded shaft 26 are selected such that a nut 28 can be adequately placed onto the exposed portion of the threaded portion once the mounting element 24 is inserted into a bolt hole 30 of the tow bar 12

The hitch ball element 22 is a generally spherically shaped piece with a cavity 48. The cavity 48 has a mouth 60 into which the post 40 is inserted for mounting of the hitch ball assembly 16. The cavity 48 is generally cylindrical in shape and its longitudinal axis is coincident with the center of the hitch ball element 22. The cavity also has a threaded entryway 50 and also an unthreaded portion that defines an interior chamber 52. A recess 54 is formed at the inner portion of chamber 52. The threaded entryway 50 contains threads of a size and type to match those on the threaded head portion 42 of the post 40 so that the hitch ball element 22 can be screwed onto the post 40. The interior chamber 52 has a diameter larger than that of the threaded head portion 42 such that the threaded head portion 42 can rotate unrestrictedly in the interior chamber 52 of cavity 48 once the threaded head portion 42 has passed through the threaded entryway 50. This can be best seen in FIG. 5 which shows the hitch ball assembly 16 in the assembled state.

As noted, the chamber 48 includes a pilot recess 54, located opposite of the mouth 60, which is cylindrical and which is sized to receive the similarly-shaped pilot portion 44 of the post 40. The position of the recess 54 is such that, when it engages the pilot portion 44, the hitch ball element 22 is in the mounted position and the hitch ball element 22 is freely rotatable about the axis of the post 40. The depth of the recess 54 is less than the axial length of the pilot portion 44 such that the threaded head portion 42 does not contact the chamber walls when in the mounted state (see FIG. 5). The hitch ball element 22 can be of any size or shape to match that required by the hitch ball socket to be used. To this end, the present invention contemplates the use of a plurality of differently sized hitch balls, such as illustrated in FIGS. 7(a) and 7(b) or differently shaped hitch balls as illustrated in FIGS. 12(a)–12(d).

Hitch ball element 22 has one more fastener holes 56 which are located transverse to the axis of the chamber 48 and which pass through the hitch ball element 22. The axes of these fastener holes 56 are located to be tangent to the outer surface of the post 40 when it is in the mounted state. Correspondingly, the post 40 includes a groove 46 which is semi-circular in section and which is positioned on the post 40 such that, when in the mounted state, a fastener 32 (shown in FIG. 2) can be inserted into the holes 56 with legs 33 thatand will pass tangentially through the groove thereby preventing the hitch ball element 22 from being removed until the fastener 32 is withdrawn. FIGS. 2 and 5 best demonstrates this relationship. The fastener 32 may be a single pin or, as shown in FIG. 2, a U-shaped spring clip. The fastener holes 56 are located near the mouth 60 of the hitch ball element 22 such that the presence on the fastener pin 32 does not interfere with the hitch ball socket 20 when it is attached to the hitch ball element 22.

FIG. 6 shows a side view in elevation of the mounting element and FIG. 7(a) shows a sectional, side view of a representative hitch ball element 22. These are shown for the purpose of discussing the sizing of their various components. Referring to FIG. 6, the axial length of the pilot 44 is denoted by $a_5$, the axial length of the threaded head portion 42 is $a_1$ and the distance between the interface of the post 24 and the base element 34 and the proximal end of the threaded head portion 42 is $a_2$. The diameter of the pilot 44 is $b_2$ and the outer diameter of the threaded head portion 42 is $b_4$. Similarly, referring to FIG. 7(a), the axial length of the recess 54 is $a_6$, the axial length of the chamber 52 is $a_4$, and the axial length of the threaded entryway 50 is $a_3$. The diameter of the recess 54 is $b_1$ and the diameter of the chamber 52 is $b_3$. For the proper mating and operation of the hitch ball assembly $a_5$ is greater than $a_6$ and $b_2$ is less than $b_1$. Also, for the threaded head portion 42 to reside within the chamber 48 and provide free rotation, the following relationships are desired 1) $b_3$ is greater than $b_4$, 2) the sum of $a_6$ and $a_4$ must be greater than the sum of $a_1$ and $a_5$, and 3) $a_2$ is greater than $a_3$.

It should be appreciated from the foregoing that the present invention contemplates that differently sized hitch balls may be interchangeably secured to the mounting element for different towing applications. Thus, for example, one size hitch ball is illustrated in FIG. 7(a) with this hitch ball having a larger diameter than a second hitch ball such as that illustrated in FIG. 7(b). In FIG. 7(b) it may be seen that hitch ball 22 prime, is again in a spherical configuration, but hitch ball 22 prime has a smaller diameter than hitch ball 22 shown in FIG. 7(a). Hitch ball 22 prime is, however, provided with a cavity 48 prime that includes a threaded entry way 50 prime, an interior chamber 52 prime and a pilot recess 54 prime that are substantially the same as the threaded entry way 50, interior chamber 52 and pilot recess 54 of hitch ball 22. This allows hitch ball 22 prime to be placed on the mounting element 24 interchangeably with hitch ball 22.

Also, as noted above, it is possible within the scope of the invention that the hitch ball be provided with the post while the mounting element includes a cavity to receive that post. Thus, for example, as is illustrated in FIG. 8, hitch ball 80 includes a post 82 that has a threaded head portion 84. Post 82 and threaded head portion 84 are sized and adapted to mate with a cavity 86 formed in a mounting element 94. To this end, cavity 86 includes a threaded entry way 88 and then interior chamber 90 that is unthreaded. Mounting element 94 includes a shank 96 which will extend through a hole in tow bar 12 and may be secured thereon by a threaded nut 98. Here, again, threaded head portion 86 is sized to threadably engage threaded entry way 88 but to be threaded therethrough so as to reside in interior chamber 90 for free rotation once it has passed through threaded entry way 88. In this manner, hitch ball 80 may be used to tow a vehicle while providing a rotatable pivot between the tractor vehicle and the trailer vehicle. In order to disengage hitch ball 80, the user disconnects the trailer vehicle, elevates the hitch ball 80 so as to re-engage threaded head portion 86 of post 82 with threaded entry way 88 and unthread the hitch ball 80 from the mounting element 94.

Another exemplary embodiment of the present invention is shown in FIGS. 9 and 10. Beginning with FIG. 9, the hitch ball assembly 116 includes a hitch ball element 122, a mounting element 124 and an auxiliary interlock piece 132. The hitch ball element 122 includes a generally spherical, hitch ball portion 162 and a collar 164. The collar 164 is a cylindrical piece that is affixed to the outer surface of the hitch ball portion 162 and that may be actually formed integrally with hitch ball portion 162. The longitudinal axis of the collar 164 is coincident with center of the hitch ball portion 162.

The hitch ball element 122 includes a cavity 148 which is generally cylindrical in shape and its longitudinal axis is coincident with the center of the hitch ball portion 162. The cavity 148 again has a threaded entryway 150 and an interior chamber 152. The distal end of the collar 164 has a mouth 160 from which the cavity extends into the body of the hitch ball element 122. The threaded entryway 150 extends inwardly from the mouth 160 to communicate with chamber 152. Here, the cavity 148 may also extend completely through the body of the hitch ball element 122, in which case the chamber 152 is open at the distal end of the ball hitch element 122 to form a port 153. The outer cylindrical surface of the collar 164 includes a semi-circular groove 166.

The mounting element 124 includes a post 140, a base portion 168 and a mounting shank 136. The base portion 168 includes a flat-bottomed, cylindrical pedestal 170 with a frustoconically-shaped neck 172 affixed to it. The narrower end of the neck 172, opposite to the pedestal 170, includes an annular recess 174 with a longitudinal axis which is coincident with the longitudinal axis of the base portion 168. The generally cylindrical post 140 is affixed to base portion 168 and is concentric with annular recess 174. Post 140 extends outwardly from the recess with its longitudinal axis coincident with the longitudinal axis of the base portion 124. In this manner, the position of the post 140 and recess 174 define a seat for the collar 164 such that collar 164 can reside and rest against the bottom of the collar recess 174 when the hitch ball assembly 116 is in the mounted state.

FIG. 10 shows a sectional, side view of the assembly in the mounted state and demonstrates these features. The base portion 168 also includes one or more fastener bores 176 with their longitudinal axes generally perpendicular to the longitudinal axis of the post 140 (FIG. 9). Referring still to FIG. 9, these fastener bores 176 are located such that their axial centers are tangent to the groove 166 and, when in the mounted state, allow the insertion of legs 133 of a clip fastener 132 for the purpose of retaining the hitch ball element 122 on the mounting element 124. Similar to the first embodiment, FIGS. 2 through 7, the mounting element 168 has a mounting shank 136 affixed to the end opposing the post 140 with its longitudinal axis coincident to that of the post 140 and base portion 168.

The distal end of the post 140 includes a threaded head portion 142 with threads of a type and size to properly engage those of the threaded entryway 150 within the hitch ball element 122. The distal end surface of the post 140 also includes a tool recess 178 with a selected geometry to mate with a tool such as an alien or torx wrench for the purpose of providing a reaction torque when installing the mounting element 124 onto a towbar 12 with a nut or bolt connection. Those skilled in the art can realize that other means exist for accomplishing this including the presence of flats or recesses, on either the post 140 or the base portion 168, which are sized to mate with a wrench or other tool. Referring to FIGS. 3 and 4, it should be appreciated that, in the absence of or in addition to the tool recess 178, the post 140 may also include a pilot 44, similar to that of the first embodiment, with a corresponding recess 54 present in the ball hitch element 122.

Referring to the sectional view of the mounted assembly in FIG. 10, the axial length of the collar 164 is selected such that, when in the mounted position, hitch ball element 122 rests inside the recess 174 and positions the hitch ball portion 162 sufficiently far enough away from the mounting element 124 so that there is no interference to the hitch ball socket 20 when the trailer 18 is attached to the hitch ball assembly 116.

Similar to the first embodiment and as is shown in FIG. 10, the threaded entryway 150 contains threads of a size and type to match those on the threaded head portion 142 of the post 140 so that the hitch ball element 122 can be screwed onto the post 140. The unthreaded portion 152 has a diameter larger than that of the threaded head portion 142 such that the threaded head portion 142 can pass unrestricted into the unthreaded portion 152 of the chamber 148 once the threaded head portion 142 has passed through the threaded entryway 150.

The sizing of the post 140 and chamber 148 can be understood by referring again to the first exemplary embodiment shown in FIGS. 6 and 7. With a pilot 44 and recess 54 present, the conditions on the lengths and diameters of the various parts is the same as discussed previously. Without the presence of a pilot 44 and recess 54, the conditions for the proper mounting and positioning of the hitch ball assembly 116, as shown in FIG. 9, are: 1) $a_1$ is less than $a_4$, 2) $a_3$ is less than $a_2$, 3) the sum of $a_3$ and $a_4$ is greater than the sum of $a_1$ and $a_2$, and 4) $b_4$ is less than $b_3$.

Another embodiment of the auxiliary interlock structure for releasably locking the ball hitch element 122 onto the mounting element 124 and allowing free rotation is shown in FIG. 11. Here, the hitch ball element 122 is released and secured to the mounting element 124 by way of a pin structure 180 which resides in a fastener hole 182. The fastener hole 182 is a bore which passes through the body of the mounting element 124 and is aligned such that its axial center is tangent to the outer surface of the hitch ball element 122 and is positioned such that it aligns with the groove 166 on the outer surface of the collar 164. This is similar to the conditions previously described for the position of the fastener bore 176 in the embodiment depicted in FIGS. 9 and 10.

In its mounted state, the pin structure 180 resides within the fastener hole 182 and is held in place by a retaining pin 186 which is a generally cylindrical, press-fit type of connector that is mounted into a retaining pin hole 192. The retaining pin hole 192 is located such that its axial centerline is tangential to the outer surface of the pin structure 180 (when in the inserted position) and such that it engages a circular pin groove 184 located on the pin structure 180 in order to allow for the rotation of the pin structure 180 but to prevent its withdrawal from the mounting element 124.

The pin structure 180 is rotatable between two positions, an open position where the hitch ball element 122 can be freely inserted or removed from the mounting element 124 and a locked state where the pin structure 180 prevents the hitch ball element 122 from being removed or inserted. To accomplish this, the pin structure 80 has an arcuate-shaped recess, pin indent 182, on its outer surface. This pin indent defines a cam formation which is positioned and sized such that, when the pin structure 180 is in the open position, the pin indent 182 allows clearance for the collar 164 to pass into or out of the collar recess 174. Also, when the pin structure 180 is rotated into its locked position, the pin indent 182 is rotated away from the collar recess 174 thereby exposing a non-recessed portion of the cylindrical outer surface of the pin structure 180 to the collar recess 174 which prevents the removal or insertion of the hitch ball element 122. A pin recess 190 is located on the outer surface of the mounting element 124 and is sized and positioned such that, when the pin structure 180 is in the locked position, the pin structure 180 is nested within the pin recess 190. The recessing of the pin structure 180 into the body of the mounting element 124 is intended to provide adequate clearance so that, when in the locked position, the pin structure 180 does not interfere with the movement of hitch ball socket 20 when mounted onto the hitch ball assembly 116.

With reference to FIGS. 12(a)–12(d), it should be understood that, not only are differently sized trailer hitch balls contemplated by this invention but also differently shaped hitch balls. With reference to these figures, the ordinarily skilled artisan should appreciate that hitch balls of different geometrically shapes, as may be desirable, can be configured. In any of these hitch balls, the prospective cavity may be formed in the hitch ball or on its associated mounting element. When the cavity is formed to the mounting element, then, the hitch ball is provided with a mounting post having the threaded head portion as described above. However, when the mounting element is provided with the post having the threaded head portion, the cavity is then formed in the hitch ball.

Figure 12A:
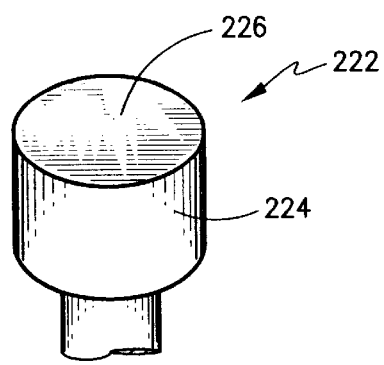
FIGS. 12($a$)–12($d$) are perspective views of alternatively shaped hitch balls according to the present invention.
Figure 12B:
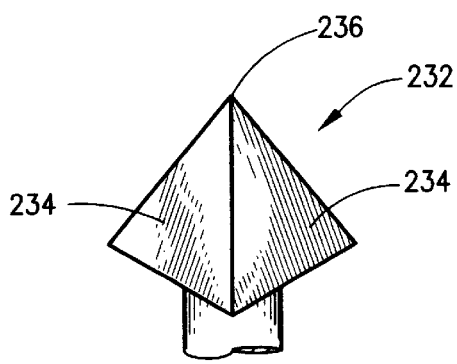
Figure 12D:
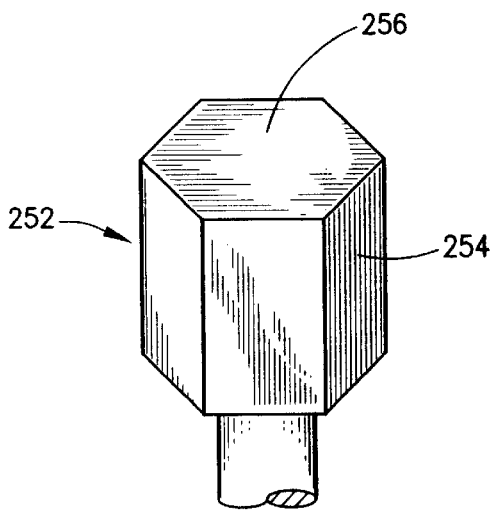
Figure 12C:
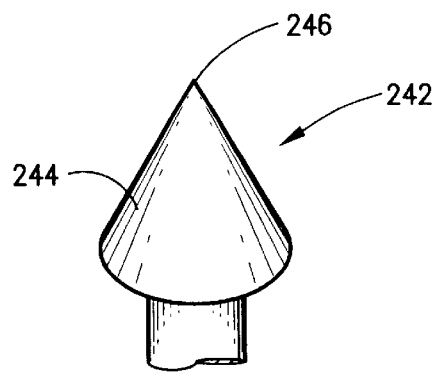

With reference to these FIGS. 12(a)–12(d), it may be seen that the hitch ball according to the present invention can include geometries wherein the hitch ball is not only spherical, but can be formed as a cylinder, a prism, a pyramid, a cone, or the like. In FIG. 12(a), hitch ball 222 is in the form of a cylinder having a cylindrical sidewall to 224 and a flat top 226. In FIG. 12(b), hitch ball 232 is formed as a pyramid having triangular sides, such as sides 234, that converge at an apex 236. In FIG. 12(c), hitch ball 242 is in the form of a cone having a conic sidewall 244 and an apex or tip 246. Finally, in FIG. 12(d), the hitch ball 252 is formed as a hexagonal prism having flat sidewalls 254 and a flat top 256. It should be appreciated, though, that the illustration of the hexagonal pyramid in FIG. 12(d) is provided for illustrative purposes only. Indeed, any prizmoidal configuration having a polygonal cross section, whether regular or irregular, could be employed based on the teachings of the present invention.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. An interchangeable hitch ball assembly for towing a trailer comprising:
   (A) a mounting element adapted to be secured to a vehicle; and
   (B) a hitch ball element adapted to be secured to said mounting element to define an assembled state, wherein;
      i. one of said mounting element and said hitch ball element includes a post that has a threaded head portion with a selected axial head length and
      ii. another of said mounting element and said hitch ball element having a cavity formed therein such that the cavity has a threaded entryway and an interior chamber, the chamber and the entryway dimensioned such that said head portion may be threaded through the threaded entryway and placed in the assembled state wherein said head portion resides in the interior chamber for free rotation therein, said hitch ball element and said mounting element thereby being freely rotatable with respect to one another yet are prevented from being disassembled by drawing said hitch ball element axially away from said mounting element.

2. An interchangeable hitch ball assembly according to claim 1 wherein said mounting element includes a base and means for securing said base to the vehicle.

3. An interchangeable hitch ball assembly according to claim 2 wherein said post is disposed on said base and the cavity is formed within said hitch ball element.

4. An interchangeable hitch ball assembly according to claim 3 wherein said means for securing includes a mounting shank which extends from the base oppositely of the post.

5. An interchangeable hitch ball assembly according to claim 4 wherein said mounting shank is coaxial with said post.

6. An interchangeable hitch ball assembly according to claim 4 including a fastener associated with said mounting shank and operative to secure said base to the vehicle.

7. An interchangeable hitch ball assembly according to claim 3 wherein said hitch ball element is generally a sphere and wherein the chamber is defined by a bore extending radially partway through said hitch ball element.

8. An interchangeable hitch ball assembly according to claim 2 wherein said means for securing includes a threaded opening in the base and a bolt.

9. An interchangeable hitch ball assembly according to claim 2 wherein said base is frustoconical.

10. An interchangeable hitch ball assembly according to claim 1 wherein the hitch ball element has a solid geometry selected from a group consisting of: a) spheres, b) cylinders, c) prisms, d) pyramids, and e) cones.

11. An interchangeable hitch ball assembly according to claim 1 including an auxiliary interlock structure separate from said head and threaded entryway and operative to selectively prevent disassembly of said mounting element and said hitch ball element.

12. An interchangeable hitch ball assembly according to claim 11 wherein said interlocking structure includes a groove on said post and an engagement piece engageable in the groove.

13. An interchangeable hitch ball assembly according to claim 12 wherein said engagement piece is a rotatable pin including a cam structure thereon such that, in a first position, said cam structure engages the groove to prevent separation of said mounting element and said hitch ball and in a second position and, in a second position, said cam structure disengages from the groove to permit separation of said mounting element and said hitch ball.

14. An interchangeable hitch ball assembly according to claim 1 wherein said axial head length has a length $a_1$, the entryway has an axial length $a_3$, the interior chamber has an axial length $a_4$, and said post includes an unthreaded portion with axial length $a_2$ wherein axial length $a_4$ is greater than axial length $a_1$ and axial length $a_2$ is greater than axial length $a_3$.

15. An interchangeable hitch ball assembly according to claim 1 wherein said post includes a pilot portion with an axial length $a_5$ and said interior chamber includes a pilot recess with axial length $a_6$ and wherein the axial length $a_5$ is greater than the axial length $a_6$.

16. An interchangeable hitch ball assembly according to claim 1 including a collar located on said hitch ball element and a collar recess in said mounting element; said collar and the collar recess dimensioned such that said collar resides in the recess when the hitch ball assembly is in the assembled state.

17. An interchangeable hitch ball assembly according to claim 16 including an auxiliary interlock structure associated with said mounting element and said hitch ball element, said auxiliary interlock structure adapted to selectively and releasably prevent disassembly of the hitch ball element from the post.

18. An interchangeable hitch ball assembly according to claim 17 wherein said auxiliary interlock structure includes a groove formed said collar and an engagement piece adapted to releasably engage the groove.

19. An interchangeable hitch ball assembly according to claim 1 wherein the interior chamber is unthreaded.

20. An interchangeable hitch ball assembly according to claim 1 including a plurality of hitch ball elements each adapted to be secured to said mounting element to define an assembled state, at least some of said hitch ball elements having different dimensions.

21. An interchangeable hitch ball assembly for towing a trailer comprising:
   (a) a mounting element adapted to be secured to a vehicle wherein said mounting element includes a base adapted to be secured to a vehicle and a post extending from said base, said post having a threaded head portion with a selected axial head length $a_1$ and an unthreaded portion with selected axial length $a_2$; and
   (b) a hitch ball element adapted to be secured to said mounting element to define an assembled state, said hitch ball element having a cavity formed therein such that the cavity has a threaded entryway of an axial length $a_3$ and an interior chamber of an axial length $a_4$ wherein the axial length $a_4$ is greater than axial length $a_1$ and axial length $a_2$ is greater than axial length $a_3$, said cavity being sized such that said head portion may be threadably engaged therein with the interior chamber and the entryway dimensioned such that, when in said assembled state, said head portion resides in the interior chamber so that said hitch ball element and said mounting element are freely rotatable with respect to one another and are prevented by the threaded entryway from being disassembled by drawing the hitch ball element axially away from the mounting element.

22. An interchangeable hitch ball assembly according to claim 21 wherein said mounting element includes a mounting shank which extends from the base oppositely of the post and including a fastener adapted to mount on said mounting shank and operative to secure said base to the vehicle.

23. An interchangeable hitch ball assembly according to claim 21 wherein the hitch ball element has a solid geometry selected from a group consisting of: a) spheres, b) cylinders, c) prisms, d) pyramids, and e) cones.

24. An interchangeable hitch ball assembly according to claim 23 wherein said hitch ball element is generally a sphere and wherein the cavity is defined by a bore extending radially partway through said hitch ball element.

25. An interchangeable hitch ball assembly according to claim 21 including an auxiliary interlock structure separate from said head and threaded entryway and operative to selectively prevent disassembly of said mounting element and said hitch ball element.

26. An interchangeable hitch ball assembly according to claim 25 wherein said interlocking structure includes a groove on said post and an engagement piece engageable in the groove.

27. An interchangeable hitch ball assembly according to claim 26 wherein said engagement piece is a rotatable pin including a cam structure thereon such that, in a first position, said cam structure engages the groove to prevent separation of said mounting element and said hitch ball and in a second position and, in a second position, said cam structure disengages from the groove to permit separation of said mounting element and said hitch ball.

28. An interchangeable hitch ball assembly according to claim 21 wherein said post includes a pilot portion with an axial length $a_5$ and said interior chamber includes a pilot recess with axial length $a_6$ and wherein the axial length $a_5$ is greater than the axial length $a_6$.

29. An interchangeable hitch ball assembly according to claim 21 including a collar located on said hitch ball element and a collar recess in said mounting element; said collar and the collar recess dimensioned such that said collar resides in the recess when the hitch ball assembly is in the assembled state.

30. An interchangeable hitch ball assembly according to claim 21 wherein the interior chamber is unthreaded.

31. An interchangeable hitch ball assembly according to claim 1 including a plurality of hitch ball elements each adapted to be secured to said mounting element to define an assembled state, at least some of said hitch ball elements having different dimensions.

32. An interchangeable hitch ball assembly for towing a trailer comprising:
(a) a mounting element adapted to be secured to a vehicle wherein said mounting element includes a post that has a threaded head portion with a selected axial head length and a pilot portion with an axial length $a_5$, and wherein said mounting element includes a base adapted to be secured to a vehicle; and
(b) a hitch ball element adapted to be secured to said mounting element to define an assembled state, wherein said hitch ball element includes a cavity formed therein such that the cavity has a threaded entryway, an interior chamber having a depth greater than the axial head length of said head portion and a pilot recess of axial length $a_6$ such that the axial length $a_5$ is greater than axial length $a_6$, the chamber and the entryway dimensioned such that said head portion may be threaded through the threaded entryway and placed in the assembled stated wherein said head portion resides in the interior chamber with the pilot portion mated with the pilot recess so that said hitch ball element and said mounting element are freely rotatable with respect to one another and are prevented from being disassembled by drawing the hitch ball element axially away from the mounting element.

33. An interchangeable hitch ball assembly according to claim 32 wherein said mounting element includes a mounting shank which extends from the base oppositely of the post and including a fastener adapted to mount on said mounting shank and operative to secure said base to the vehicle.

34. An interchangeable hitch ball assembly according to claim 32 including an auxiliary interlock structure separate from said head and threaded entryway and operative to selectively prevent disassembly of said mounting element and said hitch ball element.

35. An interchangeable hitch ball assembly according to claim 32 including a collar located on said hitch ball element and a collar recess in said mounting element; said collar and the collar recess dimensioned such that said collar resides in the recess when the hitch ball assembly is in the assembled state.

36. An interchangeable hitch ball assembly according to claim 35 including an auxiliary interlock structure associated with said mounting element and said hitch ball element, said auxiliary interlock structure adapted to selectively and releasably prevent disassembly of the hitch ball element from the post.

37. An interchangeable hitch ball assembly according to claim 36 wherein said auxiliary interlock structure includes a groove formed said collar and an engagement piece adapted to releasably engage the groove.

38. An interchangeable hitch ball assembly according to claim 32 including a plurality of hitch ball elements each adapted to be secured to said mounting element to define an assembled state, at least some of said hitch ball elements having different dimensions.

39. A hitch assembly for towing a trailer comprising:
(A) a hitch bar adapted to be connected to a tractor vehicle;
(B) a mounting element disposed on said hitch bar; and
(C) a hitch ball element adapted to be secured to said mounting element to define an assembled state, wherein;
iii. one of said mounting element and said hitch ball element includes a post that has a threaded head portion with a selected axial head length and
iv. another of said mounting element and said hitch ball element having a cavity formed therein such that the cavity has a threaded entryway and an interior chamber, the chamber and the entryway dimensioned such that said head portion may be threaded through the threaded entryway and placed in the assembled state wherein said head portion resides in the interior chamber for free rotation therein, said hitch ball element and said mounting element thereby being freely rotatable with respect to one another yet are prevented from being disassembled by drawing said hitch ball element axially away from said mounting element.

40. A hitch assembly according to claim 39 including a hitch receiver adapted to be mounted to the tractor vehicle, said hitch bar constructed to be releasably received and connected to said hitch receiver.

41. A hitch assembly according to claim 39 including a plurality of hitch ball elements each adapted to be secured to said mounting element to define an assembled state, at least some of said hitch ball elements having different dimensions.

42. A method for attaching an interchangeable hitch ball element to a mounting element comprising:
  (a) inserting a head portion into a threaded entryway of a cavity provided in said hitch ball element and rotating the hitch ball element with respect to the mounting element in a direction to engage the threads of the entryway with threads provided on the mounting element;
  (b) further rotating said hitch ball element with respect to the mounting element to move the threads of the mounting post beyond the entryway threads and into an interior chamber provided in said hitch ball; and
  (c) allowing free rotation of said hitch ball element on said mounting element while said head portion is located in the chamber.

* * * * *